US008209077B2

(12) United States Patent
Raichle et al.

(10) Patent No.: US 8,209,077 B2
(45) Date of Patent: Jun. 26, 2012

(54) DIAGNOSTIC CONNECTOR POWER FOR TABLET/LAPTOP PCS

(75) Inventors: Kurt Raichle, Owatonna, MN (US); Indermohan Sethi, Macomb Township, MI (US); Michael Muller, Harper Woods, MI (US)

(73) Assignee: SPX Corporation, Charlotte, NC (US)

( * ) Notice: Subject to any disclaimer, the term of this patent is extended or adjusted under 35 U.S.C. 154(b) by 390 days.

(21) Appl. No.: 12/500,303

(22) Filed: Jul. 9, 2009

(65) Prior Publication Data

US 2009/0289756 A1 Nov. 26, 2009

Related U.S. Application Data

(62) Division of application No. 11/302,157, filed on Dec. 14, 2005, now Pat. No. 7,571,034.

(51) Int. Cl.
*G01M 15/02* (2006.01)

(52) U.S. Cl. .................... 701/29.6; 701/29.1; 701/33.2; 701/33.7; 340/2.1; 340/2.8

(58) Field of Classification Search .................... 701/29, 701/32, 33, 35; 702/108, 113, 121, 122; 340/2.1, 2.4, 2.7, 2.8; 361/187; 307/112, 307/127
See application file for complete search history.

(56) References Cited

U.S. PATENT DOCUMENTS

| | | | | |
|---|---|---|---|---|
| 5,459,660 | A | 10/1995 | Berra | 364/424.03 |
| 5,555,498 | A | 9/1996 | Berra et al. | 364/424.03 |
| 5,850,209 | A | 12/1998 | Lemke et al. | 345/156 |
| 6,236,917 | B1 | 5/2001 | Liebl et al. | 701/29 |
| 6,526,340 | B1 | 2/2003 | Reul et al. | 701/29 |
| 6,538,472 | B1 | 3/2003 | McGee | 326/82 |
| 6,603,394 | B2 | 8/2003 | Raichle et al. | 340/438 |
| 6,636,789 | B2 | 10/2003 | Bird et al. | 701/29 |
| 6,807,469 | B2 * | 10/2004 | Funkhouser et al. | 701/33 |
| 6,827,763 | B2 | 12/2004 | McGee et al. | 95/287 |
| 6,903,329 | B2 | 6/2005 | Gentala | 250/238 |
| 7,359,772 | B2 * | 4/2008 | Paturi et al. | 701/29 |
| 7,869,920 | B2 * | 1/2011 | Mark | 701/36 |
| 2002/0004694 | A1 * | 1/2002 | McLeod et al. | 701/29 |

OTHER PUBLICATIONS

ETAS—Vehicle Interface Modules Overview; http://en.etasgroup.com/products/vim/; Jul. 29, 2005.

* cited by examiner

*Primary Examiner* — Khoi Tran
*Assistant Examiner* — Spencer Patton
(74) *Attorney, Agent, or Firm* — Baker & Hostetler LLP

(57) ABSTRACT

An adapter for coupling a vehicle communication interface device and a computer processing device to a signal source comprises a first port configured for communication with the communication interface device and a second port configured for communication with the computer processing device. The adapter can include a receptacle configured to receive signals having a data portion and a power portion. The adapter can further identify the received signals as being one of vehicle signals or computer signals. Moreover, the adapter can include a relay having a first state associated with the vehicle signals for relaying the vehicle signals between the first port and the signal source and a second state associated with the computer signals for relaying the computer signals between the second port and the signal source. The relay can be selectively placed in one of the first and the second states associated with the received signals as identified by the receptacle.

18 Claims, 4 Drawing Sheets

DIAGNOSTIC CONNECTOR POWER FOR TABLET/LAPTOP PCS

CROSS-REFERENCE TO RELATED APPLICATIONS

This application claims benefit of and is a divisional of U.S. patent application Ser. No. 11/302,157, filed Dec. 14, 2005, entitled "Diagnostic Connector Power for Tablet/Laptop PCs," which is hereby incorporated by reference in its entirety.

FIELD OF THE INVENTION

The present invention relates generally to the field of vehicle diagnostics. More particularly, the present invention relates to an adapter that can facilitate use of a single cable to couple a vehicle communication interface device and a computer to either a vehicle on-board diagnostic system or a computer network.

BACKGROUND OF THE INVENTION

Motor vehicles include electronic control units (ECU) forming an on-board diagnostic (OBD) system for controlling various systems and/or subsystems within the vehicle. Such control units, for example, are employed to control the engine, transmission, brakes and the steering mechanism. These control units are typically coupled to a variety of sensors and/or actuators. Depending on the vehicle, the control units may implement various different communication protocols. In addition, many of these control units operate at different voltage levels and may transmit data and signal information in differential or single-ended modes.

In the vehicle industry, computer devices such as, for example, hand-held, laptop or tablet computers are used to communicate with a vehicle diagnostic system for the purpose of motor vehicle maintenance and repair. The computer device can communicate with the ECUs to trouble-shoot problems associated with the various systems and sub-systems. The computer devices are generally not compatible with the communication protocols of the ECU. To properly interface the computer device with the ECU, a vehicle communication interface (VCI) is generally provided to enable communication between the computer device and the ECU. Typically, the VCI is coupled to the ECU by way of a data link connector (DLC) and a cable connection. The DLC and cable connection generally support a limited number of communication protocols for ECUs, for example, SAE J1962. Because of the limited protocols supported by today's DLCs and cable connections, a computer user could not use the SAE J1962 cable connection and the VCI to interface the computer device with a USB port of a computer network such as, for example, a LAN, WAN or Internet. Instead, if a technician completed the vehicle diagnostic test and wanted to connect the computer to a computer network, the technician was forced to change out the cable connections or otherwise provide additional Ethernet cable connections for direct connection to the USB port of the computer. In addition, to power the computer device, the technician would need to provide a separate power supply connection to the computer. The use of multiple cables for communication and powering of the computer device can clutter the work space and make it otherwise inconvenient to interchange computer communication between the vehicle and the computer network.

Accordingly, it is desirable to provide an apparatus and method for coupling a vehicle communication interface device and a computer to either a vehicle on-board diagnostic system or a computer network using a single cable. More specifically, it is desirable to provide an adapter that can enable a VCI and computer to use a SAE J1962 cable connection for either communication with an OBD system or a computer network.

SUMMARY OF THE INVENTION

The foregoing needs are met, to a great extent, by the present invention, wherein in one aspect an apparatus and method is provided to couple a vehicle communication interface device and a computer to either a vehicle on-board diagnostic system or a computer network using a single cable.

In accordance with one embodiment of the present invention, an adapter for coupling a vehicle communication interface device and a computer processing device to a signal source comprises a first port configured for communication with the communication interface device and a second port configured for communication with the computer processing device. In addition, the adapter can include a receptacle configured to receive signals from the signal source having a data portion and a power portion. The adapter can further identify the received signals as being one of vehicle signals or computer signals. Moreover, the adapter can include a relay coupled to the receptacle having a first state associated with the vehicle signals for relaying the vehicle signals between the first port and the signal source and a second state associated with the computer signals for relaying the computer signals between the second port and the signal source. The relay can be selectively placed in one of the first and the second states associated with the received signals as identified by the receptacle. In another embodiment, the relay can be configured to relay the data portion of the vehicle signals in the first state, the relay being further configured to relay the data portion of the computer signals in the second state. Moreover, the receptacle can be configured to identify the power portion of the received signals as being one of either a vehicle power signal or a computer power signal so as to identify the received signals as being one of vehicle signals or computer signals.

In one embodiment, the receptacle can include a diode coupled to the relay to selectively energize the relay into one of the first and second states. The adapter can further comprise a regulator coupled to the receptacle. The regulator can be configured to deliver the power portion of the received signals to the first port and the second port. In addition, the regulator can be configured to regulate the power portion of the vehicle signals and deliver the regulated portion of the vehicle power portion to the second port. The adapter can further comprise a rectifier coupled to the receptacle. The rectifier can have an input configured to receive the power portion of the received signals having variable polarity. The rectifier can further have an output configured to deliver a rectified power having a constant polarity.

In another embodiment of the adapter, the receptacle can be configured to couple with one end of a SAE J1962 cable. The SAE J1962 cable can be further configured to couple with the signal source and deliver the signals from the signal source. Moreover the adapter can be configured so as to include the SAE J1962 cable and form a kit.

In yet another embodiment of the present invention, a method of adaptively placing a computer device in communication with a signal source. The method can comprise receiving signals from the signal source at a receptacle. The received signals can have a power portion and a data portion. The method can further comprise identifying the received signals as being one of vehicle signals and computer signals so as to place the computer device in communication with the signal source. In one embodiment, when identifying the received signals as being vehicle signals, the method can comprise relaying the data portion of the received signals to a first port coupled to the receptacle, wherein the first port is configured to communicate with a vehicle communication interface device in communication with the computer device. Moreover, wherein when identifying the received signals as being computer signals, the method can comprise relaying the data portion of the received signals to a second port coupled to the receptacle, wherein the second port is configured to communicate with the computer device. In addition, the method can further comprise selectively permitting the power portion to energize a relay for selectively relaying the data portion between the signal source and the computer device.

Another embodiment according to the present invention provides adapting means for coupling a vehicle communication interface device and a computer processing device to a signal source for receiving signals, the received signals having a power portion and a data portion. The adapting means can comprise first port means configured for communication with the communication interface device and second port means configured for communication with the computer processing device. In addition, the adapter means can have receptacle means for receiving and identifying the signals as one of either vehicle signals or computer signals. Relay means can be provided having a first state for relaying the data portion of the vehicle signals to the first port means and a second state for relaying the data portion of the computer signals to the second port means. Moreover, the relay means can be coupled to the receptacle means so as to place the relay means in one of the first and second states for selectively relaying the data portion of the received signals to the first and second port.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

An embodiment in accordance with the present invention provides a computerized apparatus and method for coupling a vehicle communication interface device and a computer processing device to a signal source. The adapter can comprise a first port configured for communication with the communication interface device and a second port configured for communication with the computer processing device. In addition, the adapter can include a receptacle configured to receive signals from the signal source having a data portion and a power portion. The adapter can further identify the received signals as being one of vehicle signals or computer signals. Moreover, the adapter can have a relay coupled to the receptacle. The relay can have a first state associated with the vehicle signals for relaying the vehicle signals to the first port and a second state associated with the computer signals for relaying the computer signals to the second port. The relay can be configured so as to be selectively placed in one of the first and the second states associated with the received signal as identified by the receptacle. An adapter in accordance with the present invention can adapt a single cable such as, for example, a SAE J1962 cable, for connecting a vehicle interface and computer to either an vehicle diagnostic system or to a computer docking station.

Figure 1:
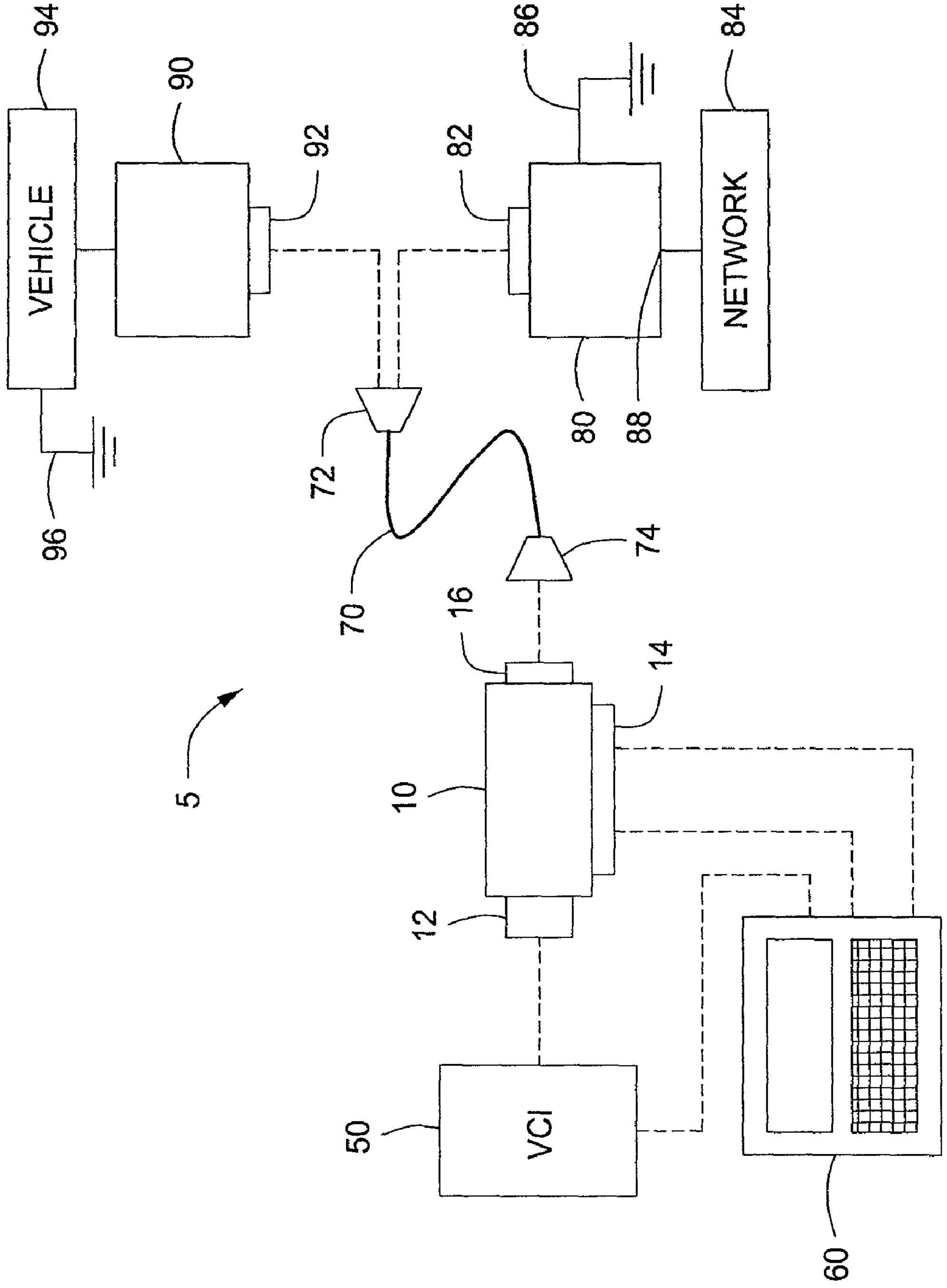
FIG. 1 is a schematic diagram of an adapter according to one embodiment of the present invention connected to an illustrative vehicle diagnostic system.

Shown in FIG. 1 is a data link connector (DLC) or adapter 10 according to one embodiment of the present invention within an exploded schematic view of an exemplary vehicle diagnostic system 5. As shown, the adapter 10 is configured to adapt a cable 70 for placing a vehicle communication interface device (VCI) 50 and a computer device 60 in communication with either an on-board diagnostic (OBD) system 90 of a vehicle 94 or with a docking station 80 connected to a computer network 84. The cable 70 can be, for example, a SAE standard J1962 cable having on each end a SAE J1962 connector 72, 74. The connector 72 can be configured to mate with a complementary connector 92 on the OBD system 90. The OBD system 90 can be configured to provide various vehicle signals such as for example, diagnostic codes, sensor data or vehicle module data. In addition, the vehicle signals can include a vehicle power signal, for example, as generated from a vehicle power source 96. Accordingly, with the cable 70 connected to the OBD system 90, the cable 70 can carry the various vehicle signals of OBD system 90 including the various data and power signals.

The docking station 80 can include a connector 82 for complimentary coupling to the SAE J1962 connector 72. The docking station 80 can be configured so as to provide various computer signals. More specifically, the docking station 80 can include a port 88 to connect to or be in communication with a computer network 84, such as, for example, LAN, WAN, or the Internet, to transfer computer signals including computer data to another networked device such as, for example, a file server. Alternatively, port 88 can be configured to connect to or be in communication with a computer device such as, for example, a personal computer (PC), tablet PC, desktop PC, laptop, handheld or other computer device to exchange computer data. Moreover, the docking station 80 can include as many ports as necessary for connection to other computing device such as, for example, other PCs, servers, printers or displays. The additional ports can be configured for serial RS-232, USB, IEEE1394, wireless or other computer communication standards. In addition, the docking station 80 can provide a power signal, for example, by being connected to a power source 86. The power source can be, for example, 120V AC plug-in power. In addition, the docking station 80 can include a PC power transformer (not shown) to condition the power signal as a computer power signal for use by a PC. Accordingly, with the cable 70 connected to the docking station 80, the cable 70 can carry the various computer signals of the docking station 80 including the various computer data and computer power signals.

The connector 74 of the cable 70 is configured to mate with the adapter 10. More specifically, the adapter 10 has a receptacle 16 configured to mate with the connector 74 and receive the signals carried by the cable 70. The adapter 10 can further include a first port 12 for connecting to or providing communication with the VCI 50. The VCI 50 can be configured to connect, interface or communicate with a computer device 60 using a cable connection such as, for example, serial RS-232 or USB cable connection, or alternatively using a wireless connection such, for example, an IR connection. The VCI 50 can act as a translator or conduit between the computer device 60 and the OBD system 90. More specifically, the adapter 10 can relay vehicle signals carried by the cable 70 from the OBD system 90 to the VCI 50. In addition, the adapter 10 can relay the power signal carried by the cable 70 in order to power the VCI 50. The VCI 50 can translate or condition the vehicle signals, using appropriate communication protocols, for receipt by the computer 60. The computer device 60 can be, for example, a personal computer (PC), tablet PC, desktop PC, laptop PC, handheld device computing device, or vehicle diagnostic scan tool. Although FIG. 1 shows the adapter 10, the VCI 50 and the computer 60 as separate components connected together wirelessly or by cable connection, it should be understood that either the adapter 10 and/or the VCI 50 could be integrated into the computer device 60 or other single integrated device such as, for example, into the housing of an automotive scan tool.

The adapter 10 can also include a second port 14 for connecting to or providing communication between the computer 60 and the computer network 84 when such communication does not need translating or processing by the VCI 50. The adapter 10 can facilitate the computer 60 to exchange data with a computer network 84 via the docking station 80. More specifically, the adapter 10 can relay computer signals carried by the cable 70 between the computer network 84 and the computer 60. In addition, the adapter 10 can relay a power signal carried by cable 70 to power the computer 60. Accordingly, the adapter 10 can be used to connect a cable 70, VCI 50, docking station 80, and computer 60 in any combination to facilitate diagnostic testing of and communication with the OBD system 90. In particular, the adapter 10 can be configured to adapt a single cable 70 to establish communication between either 1) an OBD system 90 or 2) a computer network 84, and the VCI 50 and the computer 60 so as to properly relay the vehicle signals and computer signals that can be carried by cable 70. Alternatively, the adapter 10 can be configured and used as a direct coupling between the computer 60 and the OBD system 90 or between the computer 60 and the docking station 80 so as to eliminate the need for the cable 70. Moreover, the adapter 10 can be packaged with the docking station 80 with or without the cable 70 so as to form a kit.

Figure 2:
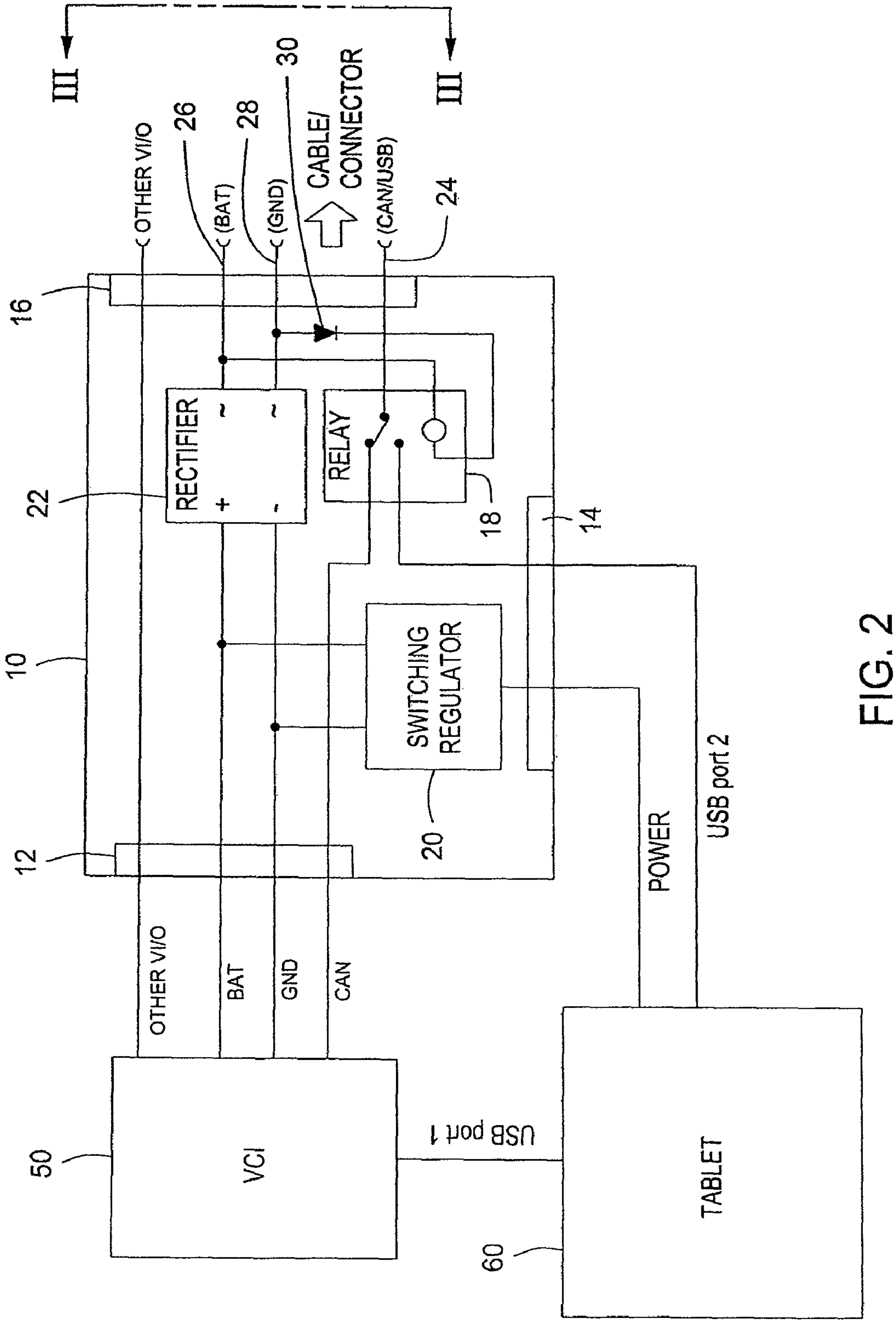
FIG. 2 is a schematic block diagram showing functional elements of the of the adapter of FIG. 1.
Figure 3:
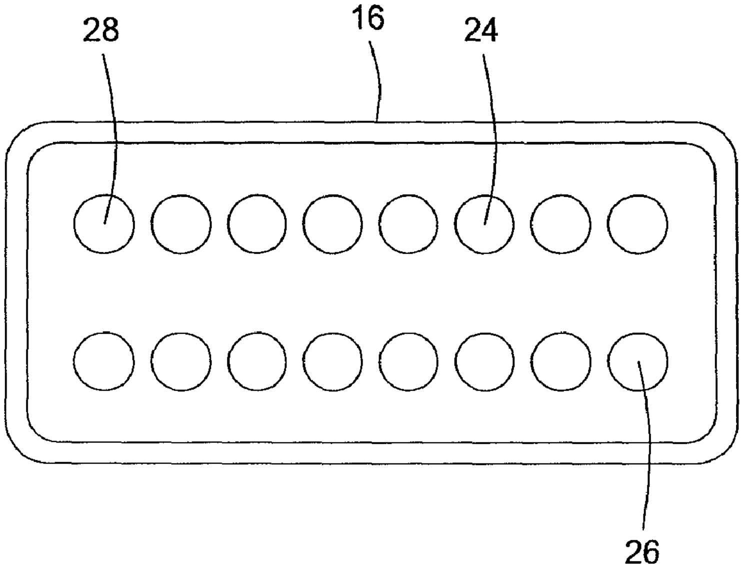
FIG. 3 is an illustrative embodiment of a receptacle viewed from line III-III of the adapter in FIG. 2 according to the present invention.

Shown in FIG. 2 is a schematic diagram of the adapter 10 having the port 12 in communication with the VCI 50 and the port 14 in communication with the computer 60. Also shown is the receptacle 16 configured to mate with the connector 74 of the cable 70 (not shown) in order to receive signals from the various signal sources such as the OBD system 90 or the computer network 84. Generally, the receptacle can be physically configured in any manner for complementary connection with the connector 74. For example, the receptacle 16 can include pin receptacles or sockets for receiving a pin-type connector 74. Alternatively, the receptacle 16 can include complementary pin connectors where the connector 74 presents a socket-type connection. The receptacle 16 can, for example, receive vehicle signals including a vehicle data signal. The vehicle data signal can be a conditioned signal, for example, to be used in communication between the VCI 50 and a controller area network (CAN). For example, shown in FIG. 3 is an embodiment of the receptacle 16 configured for mating with a 16-pin SAE J1962 connector. The receptacle 16 can be configured with a pin receptacle 24 to receive the CAN pin connection of the SAE J1962 connector. The receptacle 16 can be further configured to receive computer signals including a computer data signal. The computer data signal can be a conditioned signal, for example, so as to follow the Universal Serial Bus (USB) standard, IEEE 1394 or other bus standards. The computer data signal can be used for communication between the computer 60 and the computer network 84. The CAN pin receptacle 24 can also be configured so as to be able to receive USB signals from a signal source such as, for example, computer network 84.

Referring back to FIG. 2, the adapter 10 can include a relay device such as, for example, relay 18 to properly relay the vehicle data signals appropriately between the OBD system 90 and the VCI 50 or to relay computer signals between the computer network 84 and the computer 60. The relay 18 can be configured to have a first state and a second state. In the first state (as shown), the relay 18 can, for example, be configured to relay vehicle signals between the OBD system 90 and the port 12 for communication with the VCI 50 and the computer 60. In the second state, the relay 18 can be configured to relay computer signals to and from the port 14 for communication between the computer 60 and the computer network 84. The relay can have a default state, for example, wherein the relay remains in the first state unless energized or otherwise configured into the second state. More specifically, the relay 18 can be configured so as to be energized by a power signal to move from one state to another.

In order for the relay 18 to be in the proper first or second state, the adapter can be configured to identify the signals received from the cable 70 as being from either the vehicle 94 or the computer network 84 and then control the state of the relay 18 accordingly. More specifically, the receptacle 16 can be configured so as to recognize or identify received signals as being either vehicle signals or computer signals. As previously described, the vehicle signals can include a vehicle power signal and a vehicle data signal; and the computer signals can include a computer power signal and a computer data signal. The receptacle can be configured to receive power signals of variable polarity, for example, the vehicle power signal can have polarity opposite to the polarity of the computer power signal. Referring again to FIG. 3, the receptacle 16 can include two pin receptacles to receive the power signal. The receptacle 16 can have a power pin receptacle 26 and a ground pin receptacle 28. The power pin receptacle 26 can be configured to receive the battery or voltage signal from the vehicle power source 96, and the ground pin receptacle 28 can be configured to receive the ground signal from the vehicle power source 96. To identify receipt of the computer signals, the receptacle 16 can be configured to receive the computer power signal having a polarity opposite or in reverse to that of the vehicle power signal. More specifically, the receptacle 16 can be configured so as to receive the voltage signal from the computer power source 86 at the ground pin receptacle 28 and receive the ground signal from the computer power source 86 at the power pin receptacle 26. The adapter can be further configured to utilize the opposite polarities between the power signals to control the state of the relay 18.

Referring back to FIG. 2, the adapter 10 can further include a rectifying device such as, for example, a diode 30 for regulating a power signal to energize and control the state of the relay 18. The diode 30 can be disposed between and coupled to the receptacle 16 and the relay 18. The diode 30 can be configured so as to limit the power signal flowing from the receptacle 16 to the relay 18. More specifically, the diode 30 can permit a power signal of a particular polarity to flow to the relay. For example, the diode 30 can permit only the computer power signal to flow from the receptacle 16 to the relay 18 so as to energize the relay 18 from, for example, the first state to the second state. Should a vehicle power signal be received at receptacle 16, the diode 30 can block the vehicle power signal from reaching the relay 18. Thus relay 18 would remain in the first state.

In operation, an embodiment of the adapter according to the present invention can operate in the following manner to properly relay vehicle and computer data signals carried by cable 70 to and from a VCI 50 and computer 60. The cable 70 can be connected to an OBD system 90 to carry vehicle data and vehicle power signals. The receptacle 16 receives the vehicle signals with the vehicle power signal being received at pin receptacles 26, 28 and the vehicle data signal being received at pin receptacle 24. The relay 18, being in a default first state, does not receive the vehicle power signal due to the diode 30 blocking or prohibiting the flow of the vehicle power signals. With the relay 18 remaining in the first state, the vehicle data signals can be relayed to, or alternatively from, the first port 12 for communication with the VCI 50.

The cable 70 can alternatively be connected to the docking station 80 for communication with the computer network 84. The cable 70 can carry computer signals including computer data and computer power signals. The receptacle 16 can receive the computer signals with the computer power signals received at pin receptacles 26, 28 and the computer data signal received at pin receptacle 24. The diode 30 can permit the flow of the computer power signal to flow to the relay 18 and energize the relay 18 from the first state to the second state. With the relay 18 in the second state the computer data signals can be relayed to or alternatively from the second port 14 for communication with the computer 60.

The power signals received by the adapter 10 can be used to provide power to both the VCI 50 and the computer 60. Each of VCI 50 and computer 60 can have different power requirements. Therefore the adapter 10 can be configured to condition the power signals accordingly. For example, the VCI 50 can require power to be provided having a polarity as provide by the vehicle power signal and ranging from about 30 Watts to about 80 Watts and more specifically from about 32 Watts to about 72 Watts. The computer 60 can require power having the same polarity as the VCI 50, but have a lower power requirement in conformance with an ISO specification. To ensure delivery of the power signals to the VCI 50 and the computer 60 with the proper polarity and the proper voltage and/or current, the adapter 10 can include another rectifying device such as, for example, a rectifier 22 in addition to a regulating device such as, for example, regulator 20.

The rectifier 22 can be coupled to the receptacle 16 to rectify power signals received by the receptacle 16 having variable polarity. The rectifier can be configured to deliver power signals to the first port 12 and the second port 14 with a proper and constant polarity. For example, rectifier 22 can have an input to receive an input signal from the receptacle 16 including a vehicle power signal having an incoming polarity. The rectifier 22 can further include an output to deliver an output signal with the same polarity to the first and second ports 12, 14. The input of the rectifier 22 can be further configured so as to receive from the receptacle 16 an input of a computer power signal with a polarity opposite to that of the vehicle power signal. The rectifier 22 can then rectify the computer power signal so as to output a rectified computer power signal having a polarity substantially similar to that of the vehicle power signal for delivery to the first and second ports 12, 14.

The adapter 10 can further include a regulating device or regulator 20 coupled to the receptacle 16 for regulating the power signal to the second port 14 for delivery to the computer 60. More specifically, the regulator 20 can be a switching regulator disposed between the rectifier 22 and the second port 14. The regulator 20 can be configured so as to limit the power draw from the rectifier 22 and deliver power in conformance with, for example, ISO specifications. For example, the computer 60 can require power in the range from about 50 Watts to about 100 Watts. The cable 70 can be connected to the docking station 80 so as to receive and carry a computer power signal such as, for example, 120V AC power. The docking station 80 can include a PC power transformer as is known in the art for outputting, for example, 130 Watts. The cable 70 can carry computer signals from the docking station 80 including the 130 Watt computer power signal. The receptacle 16 can be configured to receive the computer power signal and input the computer power signal into the rectifier 22. The rectifier 22 can rectify the computer power signal so as to have the correct polarity for delivery to the first port 12. The regulator 20 can draw a portion of the rectified computer power signal or limit the current draw from the computer power signal so as to deliver a regulated power signal to the second port 14 to power the computer 60 in accordance with required ISO or any other specifications.

The cable 70 can alternatively be connected to the vehicle 90 to carry a vehicle power signal for delivery to the adapter 10. The receptacle 16 can receive the vehicle power signal and deliver the vehicle power signal for input into the rectifier 22. The vehicle power signal being of a proper polarity can be delivered to the first port 12 to power the VCI 50. The regulator 20 can draw a portion of the vehicle power signal out of the rectifier 22 so as to limit the current draw and deliver a regulated power signal to the second port 14 to power the computer 60 in accordance with required ISO or any other specifications.

Accordingly, an adapter configured in accordance with the present invention can adapt a single cable for connecting a vehicle communication interface and computer to either a vehicle OBD system or a computer network. The various components of the adapter 10 can be configured from discrete components or alternatively can be configured as an integrated device using, for example, solid state components or integrated circuits. The adapter can facilitate communication of data signals in addition to providing power signals to both the vehicle communication interface and the computer. In one embodiment, an adapter in accordance with the present invention can adapt a cable having SAE J1962 connectors for multiple uses so as to avoid a user from having to change out cables to alternate communication between an OBD system and a computer network.

Figure 4:
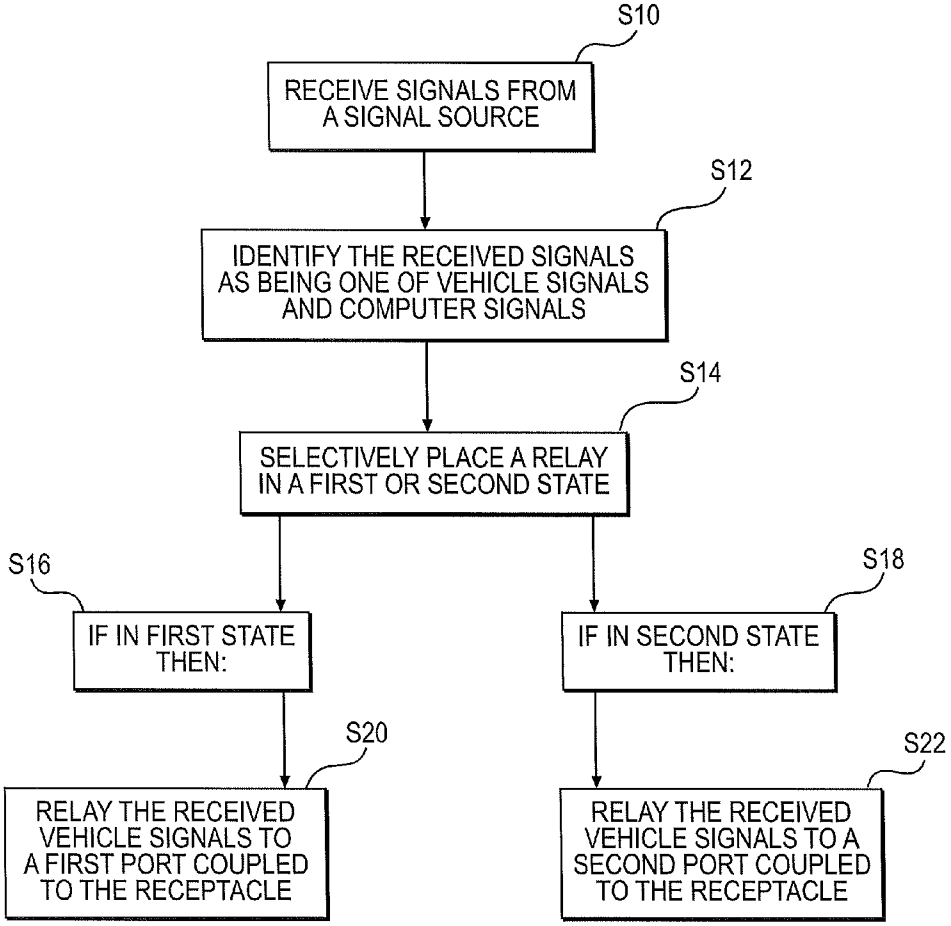
FIG. 4 is a flow chart illustrating a method of adaptively placing a computer device in connection with a signal source.

The operating steps of the adapter are laid out in FIG. 4. In step S10 receive signals from a signal source. In step S12 identify the received signals as being one of vehicle signals and computer signals. In step S14 selectively place a relay in a first or second state. In step S16 if in first state then, in step S20 relay the received vehicle signals to a first port coupled to the receptacle. In step S18 if in second state then, in step S22 relay the received vehicle signals to a first second port coupled to the receptacle.

Although an example of the adapter is shown using a power signal and its polarity to differentiate between possible incoming signals, it will be appreciated that other signal elements can be used. Also, although the adapter can be useful in the vehicle diagnostic industry it can also be used for other multiplexing applications. The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of adaptively placing a computer device in communication with a signal source, the method comprising:

receiving signals from the signal source at a receptacle, the received signals having a power portion and a data portion;

identifying the received signals as being one of vehicle signals and computer signals so as to place the computer device in communication with the signal source;

selectively placing a relay in one of a first state and second state;

relaying the received vehicle signals to a first port coupled to the receptacle when the relay is placed in the first state, the first port being configured to communicate with a vehicle communication interface device; and relaying the received computer signals to a second port coupled to the receptacle when the relay is placed in the second state, the second port being configured to communicate with the computer device.

2. The method of claim 1, wherein when identifying the received signals as being vehicle signals, relaying the data portion of the received signals to the first port coupled to the receptacle, wherein the vehicle communication interface device is in communication with the computer device.

3. The method of claim 1, wherein when identifying the received signals as being computer signals, relaying the data portion of the received signals to the second port coupled to the receptacle.

4. The method of claim 1, wherein identifying the received signals includes identifying the power portion of the received signals as being one of a vehicle power signal and a computer power signal.

5. The method of claim 4, wherein identifying the power portion of the received signals includes conditioning the vehicle power signal according to the requirements of the vehicle communication interface device.

6. The method of claim 5, wherein conditioning the vehicle power signal includes rectifying the vehicle power signal to be of a required polarity.

7. The method of claim 4, wherein identifying the power portion of the received signals includes conditioning the computer power signal according to the requirements of the computer device.

8. The method of claim 7, wherein conditioning the computer power signal includes rectifying the computer power signal to be of a required polarity.

9. The method of claim 7, wherein conditioning the computer power signal includes regulating the vehicle power signal to be of a required wattage.

10. The method of claim 4, wherein when identifying the received signals as being vehicle signals, passing the power portion of the received signals to the first port coupled to the receptacle, wherein the first port is configured to provide power to the vehicle communication interface device in communication with the computer device.

11. The method of claim 4, wherein when identifying the received signals as being computer signals, passing the power portion of the received signals to the second port coupled to the receptacle, wherein the second port is configured to provide power to the computer device.

12. The method of claim 1, further comprising selectively permitting the power portion to energize the relay for selectively relaying the data portion between the signal source and the computer device.

13. The method of claim 12, wherein selectively permitting the power portion to energize the relay includes identifying the power portion of the received signals as being one of a vehicle power signal and a computer power signal, preventing the vehicle power signal from energizing the relay, and allowing the computer power signal to energize the relay.

14. The method of claim 12, wherein selectively permitting the power portion to energize the relay includes passing one of a vehicle power signal and a computer power signal to a diode, blocking the vehicle power signal from passing through the diode and preventing the vehicle power signal from energizing the relay, and allowing the computer power signal to pass through the diode and energizing the relay.

15. The method of claim 1, further including coupling the receptacle to an SAE J1962 cable.

16. The method of claim 1, further including coupling the receptacle directly to the signal source.

17. A method of adaptively placing a computer device in communication with a signal source, the method comprising:

receiving signals at a receptacle, the received signals having a power portion and a data portion;

identifying the received signals as being one of vehicle signals and computer signals so as to place the computer device in communication with an on-board diagnostic system or a docking station;

selectively placing a relay in one of a first state and second state;

relaying the received vehicle signals to a first port coupled to the receptacle when the relay is placed in the first state, the first port being configured to communicate with a vehicle communication interface device; and relaying the received computer signals to a second port coupled to the receptacle when the relay is placed in the second state, the second port being configured to communicate with the computer device.

18. The method of claim 17, wherein when identifying the received signals as being vehicle signals, relaying the data portion of the received signals to the first port coupled to the receptacle, wherein the vehicle communication interface device is in communication with the computer device.

* * * * *